No. 778,552. PATENTED DEC. 27, 1904.
T. RUD.
FISHING TACKLE.
APPLICATION FILED AUG. 13, 1904.
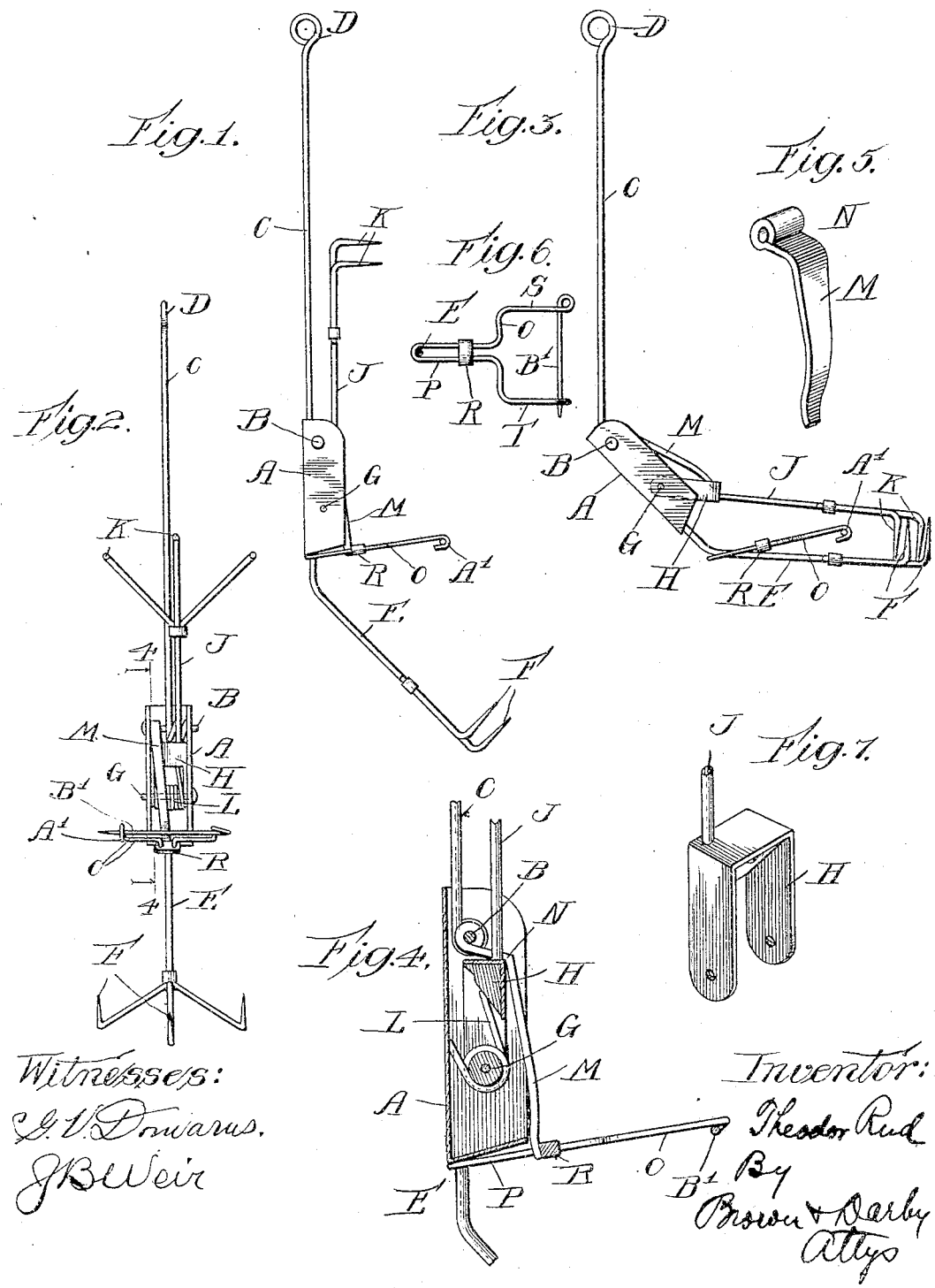
Witnesses:
G. V. Douarus.
J. B. Weir.
Inventor:
Theodor Rud
By
Brown & Darby
Attys No. 778,552. Patented December 27, 1904.

UNITED STATES PATENT OFFICE.

THEODOR RUD, OF CHICAGO, ILLINOIS.

FISHING-TACKLE.

SPECIFICATION forming part of Letters Patent No. 778,552, dated December 27, 1904.

Application filed August 13, 1904. Serial No. 220,598.

*To all whom it may concern:*

Be it known that I, THEODOR RUD, a citizen of the United States, residing at Chicago, in the county of Cook and State of Illinois, have invented a new and useful Fishing-Tackle, of which the following is a specification.

This invention relates to fishing-tackle.

The object of the invention is to provide a construction of fishing-tackle which is simple, efficient, and automatic.

A further object of the invention is to provide a fishing-tackle embodying claws or hooks adapted to be held by a trigger in separated relation against the action of means normally tending to close said jaws or hooks upon each other.

Other objects of the invention will appear more fully hereinafter.

The invention consists, substantially, in the construction, combination, location, and arrangement of parts, all as will be more fully hereinafter set forth, as shown in the accompanying drawings, and finally pointed out in the appended claims.

Referring to the accompanying drawings, and to the various views and reference-signs appearing thereon, Figure 1 is a view in side elevation of a fishing-tackle embodying the principles of my invention, the jaws or hooks being shown in open or set position. Fig. 2 is a view in front elevation of the same. Fig. 3 is a view similar to Fig. 1, showing the jaws or hooks closed upon each other. Fig. 4 is an enlarged broken detail view on the line 4 4 of Fig. 2 looking in the direction of the arrows. Fig. 5 is a detached detail view of the detent or trigger employed to set the jaws or hooks in open position. Fig. 6 is a detail view in plan of the bait-support and which is employed to detachably maintain the detent or trigger in position to hold or maintain the hooks or jaws in separated position. Fig. 7 is a broken detail view in perspective of the yoke, to which is secured one of the spring arms or jaws carrying the hooks.

The same part is designated by the same reference-sign wherever it occurs throughout the several views.

In its essential characteristics my invention includes a pair of spring arms or jaws carrying hooks and which may be separated from each other against spring-pressure and a trigger arranged to maintain such arms or jaws separated from each other, and which trigger is designed to be tripped by the bait or by the fish endeavoring to secure the bait, the bait being carried by a part which serves as a detaining device for the trigger, the jaws carrying the hooks operating when the trigger is tripped or released to close together or upon each other, so as to grasp and hold the fish therebetween.

In the accompanying drawings I have shown a construction which I have found simple, inexpensive, and efficient wherein the essential characteristics above referred to are attained; but I desire to be understood that my invention is not to be limited or restricted to the specific construction, arrangement, and details shown and now to be described, as variations therefrom and modifications therein may be made throughout a wide range and still fall within the spirit and scope of my invention.

Referring to the accompanying drawings, reference-sign A designates a frame portion comprising side plates in which is mounted a stud B, forming means for pivotally connecting to the frame part A a shank C, to which in any convenient manner the fishing-line is designed to be secured. To facilitate securing the fishing-line to the shank C the latter may be provided with an eye D. To the end of frame A is rigidly connected one end of an arm E, said arm carrying pointed hooks or projections, forming hooks F, at the outer or free end thereof. Upon a stud G, extending through side plates of frame A, is pivotally mounted a yoke H, to which is rigidly secured in any convenient manner an arm J at one end thereof, the other or free end of said arm carrying bent pointed ends forming hooks K. The arms E J are normally held closed upon each other, as shown in Fig. 3, with the hooked or pointed ends F of the arm E presenting in opposite direction with respect to and interlocking with the pointed hooked ends K of arm J.

The arms E J may be separated in any suitable or convenient manner against the action of a spring and set or held in separated relation by means of a trigger or other releasable detent and in any convenient manner whereby when the trigger or detent is released said arms close upon each other to grasp or hold whatever may be in the space between the same or between the hooked or pointed ends F K thereof at the time the release occurred. To this end I mount a coiled spring L upon stud G and arrange one end thereof to bear against the web portion of frame A and the other end thereof to bear against the yoke H, the tension of said spring being normally exerted in a direction to yieldingly maintain the arms or jaws closed upon each other and in the position shown in Fig. 3. The jaws may be held open against the action of spring L by any suitable arrangement of trigger and in any convenient manner. I have shown a simple arrangement, including a trigger M, hinged or pivoted at one end, as upon stud B, (see Figs. 1, 2, 3, and 4,) said trigger being offset or bent, as indicated at N, whereby the free end thereof may project over yoke H when the arms E J are separated, so as to hold said yoke H in position to maintain the arms E J separated against the action of spring L. The free end of trigger or detent M may be engaged in any suitable manner to maintain the same in position to hold the arms E J separated. I have shown a simple arrangement wherein I employ a bait-support O in the form of a frame, a portion P (see Fig. 6) thereof being bent into loop form and strung freely upon arm E. The loop portion P of the bait-frame is provided with a web portion or lug R, arranged to receive thereunder the free end of trigger or detent M when the tackle is in position for use. (See Fig. 4.)

The bait-frame O includes suitably-separated side arms S T, one of which terminates in a loop A', forming an eye, and the other terminates in a transversely-extending portion B', after the fashion of a safety-pin, adapted to coöperate with the loop A'. The bait is designed to be fastened upon the pin portion B' of the bait-frame. By being freely suspended or connected to the tread or arm E the bait-frame may be freely rocked or swung into position for the lug or part R to form a detent for the free end of trigger M when the apparatus is set ready for operation and in such relation with respect thereto as to be capable of being readily detached to release the trigger.

The operation of the device will be readily understood and is as follows: When the tackle is prepared for use, the arms E J are separated by rocking or swinging arm J—for instance, about its pivot-stud G—so as to separate the jaws or free ends of said arms, and which jaws or free ends carry the hooked portions F K, and the trigger M is then bent over or upon the yoke H and the bait-frame O is placed, as shown in Figs. 1, 2, and 4, in position for the lug R thereon to engage the free end of trigger M. The apparatus is now set for operation. The fish nibbling on the bait carried by the pin B' detaches the lug R from detaining engagement with the free end of trigger M, thereby releasing the arm J and permitting the same to clamp down toward the arm E. At the same time and by reason of the fact that the frame A is articulated or pivotally connected to shank C, the arm E will rise to meet arm J, as indicated in Fig. 3, thereby causing the hooked ends K F to engage the fish and hold the same. The fish will not approach the bait from either side nor from the rear, but will approach it when carried on the pin B' from the front only, thereby insuring the efficient clamping of the fish when the device is sprung or the trigger M released.

While I have referred to the device as a fishing-tackle for use in catching fish and while I have found the device efficient for this purpose, I do not desire to be limited in respect of the use to which the device is to be put, as the principles thereof are equally well adapted for use in connection with trapping animals, rodents, or the like.

Having now set forth the object and nature of my invention and a construction embodying the principles thereof, what I claim as new and useful and of my own invention, and desire to secure by Letters Patent, is—

1. In a fishing-tackle, a frame portion, a shank pivotally connected thereto, separable arms connected to said frame portion, means operating to yieldingly maintain said arms closed upon each other, a trigger to retain said arms separated, a bait-frame detachably engaging said trigger, and hooked ends carried by said separable arms.

2. In a fishing-tackle, a frame portion carrying a stud, a shank pivotally mounted upon said stud, a trigger also pivotally mounted upon said stud, separable arms connected to said frame portion, said arms carrying hook portions at the free ends thereof, means for yieldingly maintaining said arms in closed relation, said trigger operating to retain said arms in separated relation, a bait-frame with which said trigger engages, whereby when the bait-frame is detached from said trigger said arms approach each other.

3. In a fishing-tackle, a frame portion, an arm fixed thereto, a coöperating arm pivotally connected to said frame portion, a spring acting upon said pivoted arm normally operating to maintain said arms closed upon each other, said arms having pointed hooked portions at the free ends thereof, a trigger for maintaining said pivoted arm in open relation against the action of said spring, a bait-frame arranged to engage said trigger to hold the same in detaining relation, whereby when said bait-frame is moved said trigger is released and said arms close upon each other.

4. In a fishing-tackle, a frame portion, an arm rigidly connected thereto, a coöperating arm pivotally connected to said frame portion, a spring engaging said pivoted arm to maintain said arms normally closed upon each other, said arms having oppositely-presented bent and pointed ends, a trigger arranged to maintain said pivoted arm in open relation with respect to the fixed arm, a bait-frame loosely connected to the fixed arm and having a lug arranged to engage the free end of the trigger, whereby when said bait-frame is moved to release said trigger said arms close upon each other.

5. In a fishing-tackle, a frame portion having studs, a shank pivotally connected to one of said studs, an arm having bent and pointed oppositely-presenting ends, a spring operating to normally hold said arms closed upon each other, a trigger pivotally mounted upon one of said studs and arranged to maintain said pivoted arm in open relation against the action of said spring, a bait-frame loosely hung upon said fixed arm and having a lug to engage the free end of said trigger, whereby when said bait-frame is released from engaging relation with the trigger said arms close upon each other.

In witness whereof I have hereunto set my hand, this 11th day of August, 1904, in the presence of the subscribing witnesses.

THEODOR RUD.

Witnesses:
C. H. SEEM,
S. E. DARBY.